(12) United States Patent
Kraus et al.

(10) Patent No.: US 9,156,737 B2
(45) Date of Patent: Oct. 13, 2015

(54) METHOD FOR PRODUCING PHOSPHATED POLYCONDENSATION PRODUCTS AND THE USE THEREOF

(75) Inventors: Alexander Kraus, Amerang (DE); Frank Dierschke, Oppenheim (DE); Fabian Becker, Trostberg (DE); Thomas Schuhbeck, Trostberg (DE); Harald Grassl, Feichten an der Alz (DE); Karin Groess, Pittenhart (DE)

(73) Assignee: Construction Research & Technology GmbH, Trostberg (DE)

( * ) Notice: Subject to any disclaimer, the term of this patent is extended or adjusted under 35 U.S.C. 154(b) by 261 days.

(21) Appl. No.: 13/120,949

(22) PCT Filed: Sep. 7, 2009

(86) PCT No.: PCT/EP2009/061545
§ 371 (c)(1),
(2), (4) Date: Aug. 3, 2011

(87) PCT Pub. No.: WO2010/040611
PCT Pub. Date: Apr. 15, 2010

(65) Prior Publication Data
US 2011/0281975 A1    Nov. 17, 2011

(30) Foreign Application Priority Data
Oct. 6, 2008 (EP) .................... 08165916

(51) Int. Cl.
*C08G 79/02* (2006.01)
*C04B 24/24* (2006.01)
*C08G 65/327* (2006.01)
*C08G 65/335* (2006.01)
*C04B 103/30* (2006.01)
*C04B 103/32* (2006.01)

(52) U.S. Cl.
CPC ............ *C04B 24/246* (2013.01); *C08G 65/327* (2013.01); *C08G 65/3353* (2013.01); *C04B 2103/302* (2013.01); *C04B 2103/32* (2013.01)

(58) Field of Classification Search
CPC ........................... C04B 24/243; C04B 24/246
USPC .......... 528/230, 244, 271, 286, 398; 524/3, 4, 524/5
See application file for complete search history.

(56) References Cited

U.S. PATENT DOCUMENTS

| | | | |
|---|---|---|---|
| 3,275,667 A | | 9/1966 | Bohunek et al. |
| 5,614,017 A | * | 3/1997 | Shawl .......................... 106/823 |
| 6,048,659 A | * | 4/2000 | Inoue et al. ................... 430/191 |
| 6,387,176 B1 | * | 5/2002 | Widmer et al. ............... 106/808 |
| 7,022,768 B1 | | 4/2006 | Lacroix et al. |
| 7,119,152 B1 | | 10/2006 | Lacroix et al. |
| 2005/0256226 A1 | | 11/2005 | Thetford et al. |
| 2008/0108732 A1 | | 5/2008 | Wieland et al. |
| 2012/0208932 A1 | * | 8/2012 | Kraus et al. ....................... 524/3 |

FOREIGN PATENT DOCUMENTS

| | | |
|---|---|---|
| EP | 1 104 785 A1 | 6/2001 |
| WO | WO 01/38437 A1 | 5/2001 |
| WO | WO 03/072632 A1 | 9/2003 |
| WO | WO 2006/042709 A1 | 4/2006 |

OTHER PUBLICATIONS

PCT/EP2009/061545—Written Opinion of the International Searching Authority, Dec. 3, 2009.
PCT/EP2009/061545—International Search Report, Dec. 3, 2009.
PCT/EP2009/061545—International Preliminary Report on Patentability, Apr. 12, 2011.
Mexican Office Action for corresponding Mexican application, MX/a/2011/003689, dated Feb. 17, 2015.

* cited by examiner

*Primary Examiner* — Jane L Stanley
(74) *Attorney, Agent, or Firm* — Curatolo Sidoti Co., LPA; Joseph G. Curatolo; Salvatore A. Sidoti

(57) ABSTRACT

The invention relates to a process for the preparation of a phosphated polycondensate, at least one sulphonic acid being used as catalyst, and to the use of the phosphated polycondensate obtained as an admixture for aqueous suspensions of hydraulic and/or latently hydraulic binders.

15 Claims, No Drawings

METHOD FOR PRODUCING PHOSPHATED POLYCONDENSATION PRODUCTS AND THE USE THEREOF

CROSS REFERENCE TO RELATED APPLICATIONS

This application is a national stage application of International Application No. PCT/EP2009/061545, filed 7 Sep. 2009, which claims priority from European Patent Application Serial No. 08165916.1, filed 6 Oct. 2008, from which applications priority is claimed, and which are incorporated herein by reference.

The present invention relates to a process for the preparation of a phosphated polycondensate and to the use thereof as an admixture in a building material mixture.

It is known that admixtures in the form of dispersants are added to aqueous slurries or pulverulent inorganic or organic substances, such as clays, silicate powder, chalk, carbon black, crushed rock and hydraulic binders, for improving their processability, i.e. kneadability, spreadability, sprayability, pumpability or flowability. Such admixtures are capable of preventing the formation of solid agglomerates and of dispersing the particles already present and those newly formed by hydration and in this way improving the processability. This effect is utilized in particular in a targeted manner in the preparation of building material mixtures which contain hydraulic binders, such as cement, lime, gypsum, hemihydrate or anhydrite.

In order to convert these building material mixtures based on said binders, into a ready-to-use, processable form, as a rule substantially more mixing water is required than would be necessary for the subsequent hydration or hardening process. The proportion of voids which is formed in the concrete body by the excess, subsequently evaporating water leads to significantly poorer mechanical strengths and resistances.

In order to reduce this excess proportion of water at a predetermined processing consistency and/or to improve the processability at a predetermined water/binder ratio, admixtures are used which are generally referred to as water-reducing agents or plasticizers. In practice, in particular polycondensates and copolymers are used as such agents.

WO 2006/042709 describes polycondensates based on an aromatic or heteroaromatic compound (A) having 5 to 10 C atoms or heteroatoms, having at least one oxyethylene or oxypropylene radical, and an aldehyde (C) selected from the group consisting of formaldehyde, glyoxylic acid and benzaldehyde or mixtures thereof, which result in an improved plasticizing effect of inorganic binder suspensions compared with the conventionally used polycondensates and maintain this effect over a longer period ("slump retention"). In a particular embodiment, these may also be phosphated polycondensates. Mineral acids are used as catalysts for the polycondensation.

In order to obtain better storage stability and better product properties, the reaction solutions obtained according to the prior art are treated with basic compounds, especially sodium hydroxide. It has been found here to be disadvantageous that the catalysts used are obtained as salts which are only sparingly soluble in the polycondensate in the reaction with the basic compounds. This can lead to undesired precipitation of the corresponding salts in the end product. This generally results in practice in a dilution of the resulting solutions to concentrations of not more than 30% by weight solids content. Alternatively, concentrated product solutions can be prepared by removing the salts formed in a laborious manner by various methods.

It was therefore the object of the present invention to provide an economical process for preparing a phosphated polycondensate, which polycondensate is suitable as a plasticizer/water-reducing agent for concrete and can be prepared in a simple manner and at low costs. In particular, the process should afford a neutralized phosphated polycondensate which, without further purification, may have high solids contents without there being any precipitation of salts here.

The object was achieved by using at least one sulphonic acid as catalyst for the polycondensation. In particular, saturated and unsaturated alkylsulphonic acids such as methanesulphonic acid, octylsulphonic acid, dodecylsulphonic acid, vinylsulphonic acid, and/or allylsulphonic acid, and also aromatic sulphonic acids such as para-toluenesulphonic acid, benzenesulphonic acid, and/or dodecylbenzenesulphonic acid, have been found to be particularly suitable.

It has surprisingly been found that sulphonic acids are not only very suitable as catalysts for the polycondensation, but the salts formed in the neutralization also possess very good solubility in the aqueous phosphated polycondensates.

In a preferred embodiment, the inventive phosphated polycondensate is present in aqueous solution which contains 35 to 75% by weight of water and 25 to 65% by weight of dissolved dry matter, particularly preferably 40 to 60% by weight of water and 40 to 60% by weight of dissolved dry matter, in particular 45 to 55% by weight of water and 45 to 55% by weight of dissolved dry matter. The dry matter consists essentially of the anhydrous phosphated polycondensate, though it may also be advantageous for further components such as defoamers, air pore foamers, and other auxiliaries to be present.

In a preferred embodiment, the reaction mixture contains at least
(I) a monomer having a polyether side chain and an aromatic or heteroaromatic group,
(II) a phosphated monomer having an aromatic or heteroaromatic group, and
(IV) a monomer having an aldehyde group.

The molar ratio of the monomers used (I), (II) and (IV) can be varied within wide ranges. This has proved to be expedient if the molar ratio of the monomers used (IV):[(I)+(II)] is 1:0.5 to 2, in particular 1:0.9 to 2. The molar ratio of the monomers used (I):(II) is usually 1:10 to 10:1, in particular 1:5 to 3:1.

In a particularly preferred embodiment the reaction mixture contains at least
(I) a monomer having a polyether side chain and an aromatic or heteroaromatic group,
(III) a monomer having an aromatic or heteroaromatic group, (III) being at least partially phosphated during the phosphation reaction and forming the monomer (II) and/or, in the polycondensate, a structural unit (II), and
(IV) a monomer having an aldehyde group and a phosphating agent.

The monomers (I), (II) and (III) are identical here to the structural units (I), (II) and (III) formed in the polycondensate.

The molar ratio of the monomers used (I), (II), (III) and (IV) can be varied within wide ranges. This has proved to be expedient if the molar ratio of the monomers used (IV):[(I)+(III)] is 1:0.5 to 2, in particular 1:0.9 to 2.

The molar ratio of the monomers used (I):(II) is usually 1:10 to 10:1, in particular 1:5 to 3:1.

In a preferred embodiment, the molar ratio of the structural units (II):(III) is adjusted to 1:0.005 to 1:10, furthermore 1:0.01 to 1:1, in particular 1:0.01 to 1:0.2 and particularly preferably 1:0.01 to 1:0.1.

The monomers (I), (II), (III) and (IV) and, in the polycondensate, the structural unit (I), (II) and (III) are preferably represented by the following general formulae

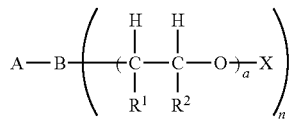
(I)

where

A are identical or different and are represented by a substituted or unsubstituted aromatic or heteroaromatic compound having 5 to 10 C atoms where B are identical or different and are represented by N, NH or O where n=2 if B=N and n=1 if B=NH or O where $R^1$ and $R^2$, independently of one another, are identical or different and are represented by a branched or straight-chain $C_1$- to $C_{10}$-alkyl radical, $C_5$- to $C_8$-cycloalkyl radical, aryl radical, heteroaryl radical or H where a are identical or different and are represented by an integer from 1 to 300 where

X are identical or different and are represented by a branched or straight-chain $C_1$- to $C_{10}$-alkyl radical, $C_5$- to $C_8$-cycloalkyl radical, aryl radical, heteroaryl radical or H

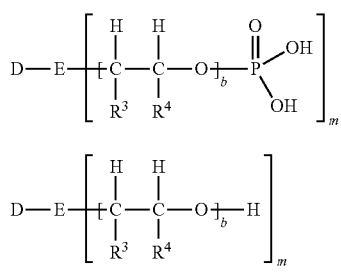

for (II) and (III)

where

D are identical or different and are represented by a substituted or unsubstituted heteroaromatic compound having 5 to 10 C atoms where E are identical or different and are represented by N, NH or O where m=2 if E=N and m=1 if E=NH or O where $R^3$ and $R^4$, independently of one another, are identical or different and are represented by a branched or straight-chain $C_1$- to $C_{10}$-alkyl radical, $C_5$- to $C_8$-cycloalkyl radical, aryl radical, heteroaryl radical or H where b are identical or different and are represented by an integer from 0 to 300

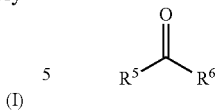
(IV)

where $R^5$ are identical or different and are represented by H, $CH_3$, COOH or a substituted or unsubstituted aromatic or heteroaromatic compound having 5 to 10 C atoms where $R^6$ are identical or different and are represented by H, $CH_3$, COOH or a substituted or unsubstituted aromatic or heteroaromatic compound having 5 to 10 C atoms.

Here, $R^5$ and $R^6$ in monomer (IV), independently of one another, are preferably represented by H, COOH and/or methyl.

The groups A and D of the monomers (I), (II) and (III) and of the structural units (I), (II) and (III) are generally represented by phenyl, 2-hydroxyphenyl, 3-hydroxyphenyl, 4-hydroxyphenyl, 2-methoxyphenyl, 3-methoxyphenyl, 4-methoxyphenyl, naphthyl, 2-hydroxynaphthyl, 4-hydroxynaphthyl, 2-methoxynaphthyl, 4-methoxynaphthyl, preferably phenyl, it being possible for A and D to be chosen independently of one another and also in each case to consist of a mixture of said compounds. The groups B and E, independently of one another, are preferably represented by O.

The radicals $R^1$, $R^2$, $R^3$ and $R^4$ can be chosen independently of one another and are preferably represented by H, methyl, ethyl or phenyl, particularly preferably by H or methyl and especially preferably by H.

a in monomer (I) and structural unit (I) is preferably represented by an integer from 5 to 280, in particular 10 to 160 and particularly preferably 12 to 120 and b in monomers (II) and (III) and structural units (II) and (III) by an integer from 0 to 10, preferably 1 to 7 and particularly preferably 1 to 5. The respective radicals, the length of which is defined by a and b, respectively, may consist here of uniform building blocks, but a mixture of different building blocks may also be expedient. Furthermore, the radicals in the monomers (I) or (II) and (III) and the structural units (I) or (II) and (III), independently of one another, may each have the same chain length, a and b each being represented by a number. As a rule, however, it will be expedient if mixtures having different chain lengths are present in each case so that the radicals of the monomers or structural units in the polycondensate have different numerical values for a and independently for b.

Frequently, the phosphated polycondensate according to the invention has a weight average molecular weight of 4000 g/mol to 150 000 g/mol, preferably 10 000 to 100 000 g/mol and particularly preferably 20 000 to 75 000 g/mol.

In a particular embodiment, the present invention envisages different variants of the reaction procedure. One possibility consists in reacting the monomers (I), (II) and (IV) in the presence of the sulphonic acid. However, it may also be expedient to carry out the phosphation of the monomer (III) to monomer (II) and the subsequent reaction with the monomers (I), (IV) and the sulphonic acid in one reaction mixture. This should be understood to mean that the phosphated component formed in the reaction solution is neither purified nor isolated. It is not necessary here that the monomer (III) is fully phosphated. It may even be advantageous when the unconverted monomer (III) is present in the polycondensate.

The phosphation of the monomer (III) can be carried out before, during or after the polycondensation. It is to be considered as preferable here to carry out both the phosphation and the polycondensation in one reaction container.

One variant consists in first reacting the monomer (III) with a phosphating agent and subjecting the monomer (II) thus obtained to polycondensation with the monomers (I), (IV), sulphonic acid and, where appropriate, monomer (III). The monomer (III) may originate here from an incomplete reaction during the phosphation reaction or can be deliberately added to the reaction mixture after the phosphation reaction.

However, it is also possible to subject the monomers (I), (III) and (IV) in the presence of sulphonic acid to a polycondensation and then to react the polycondensate obtained with a phosphating agent. In a further embodiment, the monomers (I), (III), (IV), sulphonic acid and the phosphating agent are reacted simultaneously.

In particular, polyphosphoric acid and/or phosphorus pentoxide have proved suitable here as phosphating agents.

The polycondensation and, where appropriate, the phosphation are advantageously carried out at a temperature between 20 and 140° C. and a pressure between 1 and 10 bar. In particular, a temperature range between 80 and 110° C. has proved to be expedient. The duration of the reaction may be between 0.1 and 24 hours, depending on temperature, the chemical nature of the monomers used and the desired degree of crosslinking. Once the desired degree of crosslinking has been reached, which can also be determined, for example, by measurement of the viscosity of the reaction mixture, the reaction mixture is cooled.

According to a particular embodiment, the reaction mixture is subjected to a thermal aftertreatment at a pH between 8 and 13 and a temperature between 60 and 130° C. after the end of the condensation and, where appropriate, the phosphation reaction. As a result of the thermal aftertreatment, which is advantageously between 5 minutes and 5 hours, it is possible substantially to reduce the aldehyde content, in particular the formaldehyde content, in the reaction solution.

In a further particular embodiment, the present invention envisages subjecting the reaction mixture to a vacuum aftertreatment at pressures between 10 and 900 mbar after the end of the condensation and phosphation reaction, for reducing the aldehyde content. Furthermore, however, other methods known to the person skilled in the art for reducing the formaldehyde content may also be used. An example is the addition of small amounts of sodium bisulphite, ethyleneurea and/or polyethyleneimine.

The phosphated polycondensates obtained can be used directly as plasticizers. In order to obtain a better shelf life and better product properties, it is advantageous to treat the reaction solutions with basic compounds. It is therefore to be regarded as being preferred to react the reaction mixture after the end of the condensation and, where appropriate, phosphating reaction with a basic sodium, potassium, ammonium or calcium compound. Sodium hydroxide, potassium hydroxide, ammonium hydroxide or calcium hydroxide has proved to be particularly expedient here, it being regarded as being preferred to neutralize the reaction mixture. However, other alkali metal and alkaline earth metal salts and salts of organic amine are suitable as salts of the phosphated polycondensates. A preferred embodiment envisages reacting the reaction mixture, after the condensation and, where appropriate, the phosphation reaction has ended, with basic sodium and/or calcium compounds.

Furthermore, the preparation of mixed salts of the phosphated polycondensates is regarded as being preferable. These can expediently be prepared by reacting the polycondensates with at least two basic compounds.

Thus, by a targeted choice of suitable alkali metal and/or alkaline earth metal hydroxides, it is possible by neutralization to prepare salts of the polycondensates according to the invention, with which the duration of the processability of aqueous suspensions of inorganic binders and in particular of concrete can be influenced. While a reduction in the processability over time is observable in the case of the sodium salt, a complete reversal of this behaviour takes place in the case of the calcium salt of the identical polymer, a smaller water reduction (smaller slump) occurring at the beginning and increasing with time. As a result of this, sodium salts of the phosphated polycondensates lead over time to a decrease in the processability of the binder-containing material, such as, for example, concrete or mortar, whereas the corresponding calcium salts lead with time to improved processability. By suitable choice of the amount of sodium and calcium salts of the phosphated polycondensates used, the development of the processability of binder-containing materials can thus be controlled as a function of time. Expediently, the corresponding phosphated polycondensates, which consist of sodium and calcium salts, are prepared by reaction with a mixture of basic calcium and sodium compounds, in particular calcium hydroxide and sodium hydroxide, neutralization of the reaction mixture being particularly preferred.

The present invention finally provides phosphated polycondensates which can be prepared by the above-described process.

The invention further relates to the use of the phosphated polycondensate according to the invention as an admixture for aqueous suspensions of hydraulic and/or latently hydraulic binders.

Typically, the hydraulic binder is present as cement, lime, gypsum, hemihydrate or anhydrite or as mixtures of these components, preferably as cement. The latently hydraulic binder is usually present as fly ash, trass or blast furnace slag.

Based on the weight of the inorganic binder, the phosphated polycondensate is used in an amount of 0.01 to 10% by weight, in particular 0.05 to 5% by weight.

In the preparation of phosphated polycondensation products according to the prior art, owing to the use of strong mineral acids, in particular hydrochloric acid and sulphuric acid, reactors made of enamelled steel or particularly corrosion-resistant and expensive specialty alloys have to be used. In the inventive use of sulphonic acids, it is therefore to be considered as particularly advantageous that the reaction can be carried out in standard reactors made of stainless steel. The process according to the invention for the preparation of the phosphated polycondensates is furthermore very inexpensive, no further purification of intermediates being required. In particular, no wastes which have to be disposed of form in the process according to the invention. Thus, the claimed process also constitutes further progress compared with the prior art from environmental points of view. The reaction mixture obtained can be put directly to the intended use as an admixture for building material mixtures, after treatment with basic compounds. Here, it is particularly advantageous that there is no precipitation of salts after the treatment with basic compounds when the solids content of the product solution at 20° C. is more than 30%. The reaction mixture obtained according to the invention, which, in a preferred embodiment, may contain a solids content of 65%, possess, as a further advantage, improved miscibility with other organic additives, especially defoamers and air pore foamers. Furthermore, relatively highly concentrated solutions lead to lowering of the costs for transport and storage. The underlying object of the invention is thus achieved in its entirety.

The present invention is to be described below in more detail with reference to working examples.

EXAMPLES

Example 1 (Comparative Example)

A heatable reactor equipped with a stirrer is filled with 445 parts of poly(ethylene oxide) monophenyl ether (average molecular weight 5000 g/mol), 34.9 parts of concentrated sulphuric acid, 23.2 parts of water, 577 parts of oligoethylene glycol monophenyl ether phosphoric acid ester (average molecular weight 324 g/mol) and 26.7 parts of 30% strength formaldehyde solution. The reaction mixture is heated to 105° C. for 6 hours with stirring. Thereafter, it is allowed to cool and is neutralized with 50% strength sodium hydroxide solution to pH 6.5-7.

The polycondensate thus obtained has, according to GPC, a mean molecular weight of $M_w$=28500 g/mol combined with a polydispersity of approx. 1.8.

Example 2

A heatable reactor equipped with a stirrer is filled with 600 parts of poly(ethylene oxide) monophenyl ether (average molecular weight 5000 g/mol), 47.2 parts of concentrated methanesulphonic acid, 12 parts of water, 110 parts of oligoethylene glycol monophenyl ether phosphoric acid ester (average molecular weight 368 g/mol) and 14.7 parts of paraformaldehyde. The reaction mixture is heated to 115° C. for 3 hours with stirring. Thereafter, it is allowed to cool and is neutralized with 50% strength sodium hydroxide solution to pH 6.5-7.

The polycondensate thus obtained has, according to GPC, a mean molecular weight of $M_w$=33500 g/mol combined with a polydispersity of approx. 2.0.

Testing of the phase stability of the polycondensates under two different storage conditions:

Here, it shall be examined whether the polycondensates according to the invention can be stored over a prolonged period at relatively high solids contents without this resulting in undesired phase separation phenomena (salt precipitations). For this purpose, the polycondensates described in examples 1 and 2 are each divided into 4 portions. These portions are made up with different amounts of water, such that four samples with different solids contents are obtained in each case (see table 1):

TABLE 1

| | Solids content in % by weight | | | |
|---|---|---|---|---|
| Example 1 | 29.8 | 36.1 | 47.8 | 60.1 |
| Example 2 | 30.4 | 34.9 | 48.3 | 58.5 |

Each of the 8 portions listed in table 1 is divided into two portions of equal size, which are stored under two different conditions: A series A of 8 portions is stored at room temperature, while the other series B is stored, in a 24-hour alternation, in a refrigerator at 4° C. and at room temperature. These significant temperature variations generally significantly accelerate phase separation. Both series are observed over a period of 6 weeks. The results are compiled in tables 2 and 3.

The tests show clearly that polycondensates according to example 1 (comparative example) can be stored with long-term phase stability only at solids contents below 30% by weight, while polycondensates according to the invention, according to example 2, can be stored with long-term phase stability at significantly higher solids contents of up to almost 50% by weight.

TABLE 2

| Series A (room temp.) | Solids content in % by weight | | | |
|---|---|---|---|---|
| Example 1 | 29.8 | 36.1 | 47.8 | 60.1 |
| Phase stability | clear solution, stable over 6 weeks | clear solution, salt precipitation from day 16 | cloudy solution, salt precipitation from day 1 | cloudy solution, salt precipitation from day 1 |
| Example 2 | 30.4 | 34.9 | 48.3 | 58.5 |
| Phase stability | clear solution, stable over 6 weeks | clear solution, stable over 6 weeks | clear solution, stable over 6 weeks | cloudy solution, salt precipitation from day 9 |

TABLE 3

| Series B (alternating 4° C., approx. 21° C.) | Solids content in % by weight | | | |
|---|---|---|---|---|
| Example 1 | 29.8 | 36.1 | 47.8 | 60.1 |
| Phase stability | clear solution, stable over 6 weeks | clear solution, salt precipitation from day 3 | cloudy solution, salt precipitation from day 1 | cloudy solution, salt precipitation from day 1 |
| Example 2 | 30.4 | 34.9 | 48.3 | 58.5 |
| Phase stability | clear solution, stable over 6 weeks | clear solution, stable over 6 weeks | clear solution, stable over 6 weeks | cloudy solution, salt precipitation from day 3 |

Example 3

A heatable reactor equipped with stirrer is filled with 800 parts of poly(ethylene oxide) monophenyl ether (average molecular weight 5000 g/mol), 65.8 parts of 70% strength methanesulphonic acid, 147 parts of oligoethylene glycol monophenyl ether phosphoric acid ester (average molecular weight 368 g/mol) and 18.6 parts of paraformaldehyde. The reaction mixture is heated to 115° C. for 5 hours with stirring. Thereafter, it is allowed to cool and is neutralized with 50% strength sodium hydroxide solution to pH 6.5-7. Finally, it is diluted to a solids content of 46-48% by adding water.

The polycondensate thus obtained has, according to GPC, a mean molecular weight of $M_w=33200$ g/mol combined with a polydispersity of approx. 1.9.

Example 4

A heatable reactor equipped with a stirrer is filled with 600 parts of poly(ethylene oxide) monophenyl ether (average molecular weight 5000 g/mol), 105.4 parts of 65% strength para-toluenesulphonic acid, 110 parts of oligoethylene glycol monophenyl ether phosphoric acid ester (average molecular weight 368 g/mol) and 14 parts of paraformaldehyde. The reaction mixture is heated to 110° C. for 5 hours with stirring. Thereafter, the mixture is allowed to cool and is neutralized with 50% strength sodium hydroxide solution to pH 6.5-7. Finally, it is diluted to a solids content of 46-48% by adding water. The polycondensate thus obtained has, according to GPC, a mean molecular weight of $M_w=19370$ g/mol combined with a polydispersity of approx. 2.1.

Example 5

A heatable reactor equipped with a stirrer is filled with 600 parts of poly(ethylene oxide) monophenyl ether (average molecular weight 5000 g/mol), 82.7 parts of para-toluenesulphonic acid, 110 parts of oligoethylene glycol monophenyl ether phosphoric acid ester (average molecular weight 368 g/mol) and 14 parts of paraformaldehyde. The reaction mixture is heated to 115° C. for 5 hours with stirring. Thereafter, the mixture is allowed to cool and is neutralized with 50% strength sodium hydroxide solution to pH 6.5-7. Finally, it is diluted to a solids content of 46-48% by adding water.

The polycondensate thus obtained has, according to GPC, a mean molecular weight of $M_w=24560$ g/mol combined with a polydispersity of approx. 2.0.

Application test: reduction of the water requirement of a mortar while maintaining the consistency.

Mixing Sequence for Mortar Mix:

600 g of cement powder are homogenized in the dry state and introduced into an RILEM mixer. Thereafter, the necessary amount of water corresponding to a water/cement value is added and mixing is effected for 30 s at 140 rpm (speed I). The addition of the sand mixture is then effected with the aid of a funnel while the mixer is running, and mixing is effected for 30 s at 140 rpm (speed I). After a pause of 1.5 min in the mixing, the edges of the mixer are cleaned and a corresponding amount of plasticizer is added. Mixing is effected for a further 60 s at 285 rpm (speed II) and the slump is then determined by tapping 10 times on a flow table with a Hagermann cone (DIN EN 1015-3).

Here, the metering of the plasticizers is kept constant and the water/cement ratio is adapted so that a slump of about 24.5 cm is obtained. The mortar based on Karlstadt CEM I 42.5 R and a sand/cement ratio of 2.2 is used. The sand consists of a mixture of 70% by weight of standard sand and 30% by weight of quartz sand.

The results of the application tests of the products obtained according to examples 1 to 4 are shown in the table below:

| Example | Dose [% solids based on cement] | w/c | Slump [cm] |
|---|---|---|---|
| Zero value | — | 0.570 | 24.7 |
| 1 | 0.2 | 0.425 | 25 |
| 2 | 0.2 | 0.415 | 24.8 |
| 3 | 0.2 | 0.428 | 24.3 |
| 4 | 0.2 | 0.435 | 24.0 |
| 5 | 0.2 | 0.425 | 24.4 |

The invention claimed is:

1. A process for preparing a phosphated polycondensate in a reaction mixture, comprising:
   subjecting the reaction mixture to a polycondensation reaction in the presence of at least one sulphonic acid as catalyst,
   wherein
   (a) the reaction mixture contains at least
      (I) a monomer having a polyether side chain and an aromatic or heteroaromatic group, the monomer (I) forming a structural unit (I) in the polycondensate,
      (II) a phosphated monomer having an aromatic or heteroaromatic group, the monomer (II) forming a structural unit (II) in the polycondensate, and
      (IV) a monomer having an aldehyde group; or
   (b) the reaction mixture contains at least
      (I) a monomer having a polyether side chain and an aromatic or heteroaromatic group, the monomer (I) forming a structural unit (I) in the polycondensate,
      (III) a monomer having an aromatic or heteroaromatic group, monomer (III) forming structural unit III in the polycondensate, or being at least partially phosphated during a phosphation reaction, forming the monomer (II) and/or, in the polycondensate, a structural unit (II), and
      (IV) a monomer having an aldehyde group, and,
      a phosphating agent,
      wherein at least partial phosphation of monomer (III) is carried out before, during or after the polycondensation reaction, and,
   wherein the phosphated polycondensate comprises structural units (I) and (II) when reaction mixture (a) is subjected to the polycondensation reaction, and structural units (I), (II) and (III) when reaction mixture (b) is subjected to the polycondensation reaction.

2. The process according to claim 1, wherein the sulphonic acid is a saturated or unsaturated alkylsulphonic acid and/or aromatic sulphonic acid.

3. The process according to claim 1, wherein the phosphated polycondensate is present in aqueous solution which contains 35 to 75% by weight of water and 25 to 65% by weight of dissolved dry matter.

4. The process according to claim 1, wherein the reaction mixture contains at least
   (I) a monomer having a polyether side chain and an aromatic or heteroaromatic group,
   (II) a phosphated monomer having an aromatic or heteroaromatic group and
   (IV) a monomer having an aldehyde group.

5. The process according to claim 4, wherein the molar ratio of the monomers (IV):[(I)+(II)] is 1:0.5 to 2.

6. The process according to claim 4, wherein the molar ratio of the monomers (I):(II) is 1:10 to 10:1.

7. The process according to claim 1, wherein the reaction mixture contains at least (I) a monomer having a polyether side chain and an aromatic or heteroaromatic group, (III) a monomer having an aromatic or heteroaromatic group, monomer (III) being at least partially phosphated during the phosphation reaction and forming the monomer (II) and/or, in the polycondensate, the structural unit (II) and (IV) a monomer having an aldehyde group and a phosphating agent.

8. The process according to claim 7, wherein the molar ratio of the monomers (IV): [(I)+(III)] is 1:0.5 to 2.

9. The process according to claim 7, wherein the molar ratio of the monomers (I):(III) is 1:10 to 10:1.

10. The process according to claim 7, wherein the molar ratio of the structural units (II):(III) is 1:0.005 to 1:10.

11. The process according to claim 1, wherein the monomers (I), (II), (III) and (IV) and in the polycondensate the structural units (I), (II) and (III) are represented by the following general formulae:

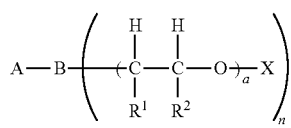
(I)

where A are identical or different and are represented by a substituted or unsubstituted aromatic or heteroaromatic compound having 5 to 10 C atoms;

where B are identical or different and are represented by N, NH or O;

where n=2 if B=N and n=1 if B=NH or O;

where $R^1$ and $R^2$, independently of one another, are identical or different and are represented by a branched or straight-chain $C_1$- to $C_{10}$-alkyl radical, $C_5$- to $C_8$-cycloalkyl radical, aryl radical, heteroaryl radical or H;

where a are identical or different and are represented by an integer from 1 to 300; and where X are identical or different and are represented by a branched or straight-chain $C_1$- to $C_{10}$-alkyl radical, $C_5$- to $C_8$-cycloalkyl radical, aryl radical, heteroaryl radical or H;

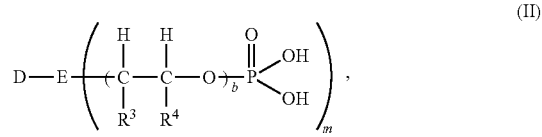
(II)

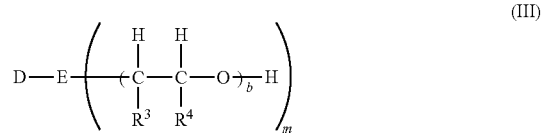
(III)

wherein for (II) and (III)

where D are identical or different and are represented by a substituted or unsubstituted aromatic or heteroaromatic compound having 5 to 10 C atoms;

where E are identical or different and are represented by N, NH or O;

where m=2 if E=N and m=1 if E=NH or O;

where $R^3$ and $R^4$, independently of one another, are identical or different and are represented by a branched or straight-chain $C_1$- to $C_{10}$-alkyl radical, $C_5$- to $C_8$-cycloalkyl radical, aryl radical, heteroaryl radical or H;

where b are identical or different and are represented by an integer from 0 to 300; and

(IV)

where $R^5$ are identical or different and are represented by H, $CH_3$, COOH or a substituted or unsubstituted aromatic or heteroaromatic compound having 5 to 10 C atoms; and where $R^6$ are identical or different and are represented by H, $CH_3$, COOH or a substituted or unsubstituted aromatic or heteroaromatic compound having 5 to 10 C atoms.

12. The process according to claim 1, wherein the polycondensation reaction and optionally the at least partial phosphation reaction are carried out at a temperature between 20 and 140° C. and a pressure between 1 and 10 bar.

13. The process according to claim 1, wherein the reaction mixture, after the condensation reaction and optionally the at least partial phosphation reaction has ended, is reacted with basic sodium and/or basic calcium compounds.

14. A phosphated polycondensate which is prepared by a process according to claim 1.

15. A process comprising adding a phosphated polycondensate according to claim 14 as a water-reducing admixture to an aqueous suspension of hydraulic and/or latently hydraulic binder or binders.

* * * * *